UNITED STATES PATENT OFFICE.

FRANK H. BRYANT, OF LOS ANGELES, CALIFORNIA.

FOOD PRODUCT.

1,258,530. Specification of Letters Patent. Patented Mar. 5, 1918.

No Drawing. Application filed January 7, 1918. Serial No. 210,720.

*To all whom it may concern:*

Be it known that I, FRANK H. BRYANT, a citizen of the United States, residing at Los Angeles, in the county of Los Angeles and State of California, have invented a new and useful Improvement in Food Products, of which the following is a specification.

This invention relates to a product produced by treating edible plants having spines or thorns, so that they can be eaten without danger.

The specific plant to which the process is herein described as being applied is the cactus. The varieties of cacti which have spines are generally those which are best liked by cattle and poultry. Such plants, however, are protected in their natural state against being eaten, by the spines. Other natural varieties which have few or no spines are objectionable as food because of their highly acrid and nauseating juices. Certain spineless hybrid plants are difficult to propagate and are not as desirable to stock and poultry as food as the varieties having spines.

The important features of my process consist in the treatment to overcome the acrid and bitter taste, and also the removal of the spines and burs.

Cactus has been prepared as a food for cattle by burning off the spines. This process does not always completely remove the spines, resulting in the cattle having sore mouths and in puncturing of the intestines.

It has been proposed to pull out the spines from the fresh leaf by physical means. When this is done, a small bur is left attached to the fiber at the root of the spine. This bur is almost invisible, but causes the same trouble as the spine. By my process I remove the burs as well as the spine.

It has also been proposed to soften the spines by disintegrating the cactus and permitting the spines to soak in the juice of the plant. However, the spines are not appreciably softened by this method.

Cacti have leaves with fibers extending the length thereof, to which fibers relatively large spines are firmly attached. Between the fibers and secured to the fleshy part of the leaves are small spines.

Cactus also has a bitter taste, which is probably due to potash and other inorganic matter present. By my process I remove the greater part of the potash and inorganic matter making the plant more desirable as a food.

A preferred form of my process is as follows:

The cactus is gathered and then cooked, preferably in a solution to soften the spines. I have found that a mixture of ordinary table salt or sodium chlorid and cooking soda or mono-sodium carbonate dissolved in water answers the purpose well. The cooking, which the plant is subjected to, loosens the bond between the leaves and the spines and softens the latter. The salt and soda act as a seasoning producing a desirable savor in the finished product overcoming the bitter taste. The cooking solution dissolving out a high proportion of the potash and inorganic salts. The leaf is then much better tasting. The solution described above is also used for the purpose of assisting in loosening the spines. Cooking will accomplish the removal of substantially all the small spines. It also breaks down the structure of the leaf, and further, loosens the large spines, especially at the root of the latter where they are connected to the fiber.

Cooking alone is not sufficient to remove the spines and I agitate the leaves while cooking so as to loosen the spines by rubbing and abrasion. This I prefer to do in a tumbler. The wall of the tumbler is made of foraminated material preferably of wire screen. The tumbler is operated in a cooking vat containing water in which the cooking soda and salt are dissolved. Pieces of heavy material having abrasive surfaces are placed in the tumbler to assist in the operation. The fresh leaves are placed in the tumbler cylinder with the abrasive material and the cylinder then rotated. Various other agitating devices may be used in place of the tumbler, and I do not confine myself to the use of this device. This process completely loosens the spines at their roots.

The liquor obtained from cooking contains much potash and is therefore valuable. It is withdrawn and collected for use because of its high potash content.

The next step is that of drying the leaf. It is placed in evaporators or driers until it is perfectly dry. This produces a food, which will keep indefinitely.

It has been found that a light bur is still present in the product. This bur is almost invisible, but will puncture the mouths and intestines of stock. It must, therefore, be separated. This is done by grinding the dried leaf into small pieces, and passing it through separators of the type used to separate dust from grain. The cleaned meal is suitable for feeding stock.

However, I prefer to grind it further to produce a fine meal or flour. The flour lends itself readily to being pressed into cakes, making it convenient for packing and shipment.

The finished product in meal or flour form is white in color, but on the addition of water, becomes green. It has all the nutritive qualities of the untreated leaf, is devoid of the poisonous spines and fine burs so harmful to stock and will keep indefinitely. The product has a starchy content almost as high as that of corn, and a food value in calories almost as great. Analysis of a sample has shown 68.68% of carbohydrates and a food value of 1416 pound calories.

What I claim is;

1. The process of treating cactus which consists in cooking the plant in a softening solution containing sodium chlorid and mono-carbonate, and separating the plant and liquor resulting from the cooking.

2. The process of treating plants having spines, which consists in cooking the plant in a softening solution containing sodium chlorid and mono-sodium carbonate, and removing the spines therefrom.

3. The process of treating plants having spines, which consists in cooking the plant in a softening solution containing sodium chlorid and mono-sodium carbonate, removing the spines therefrom, drying the product, grinding the dried product to form a meal, and separating the burs from the meal.

4. The process of treating plants having spines, which consists in cooking the plant in a solution containing sodium chlorid and mono-sodium carbonate, and agitating the plant while cooking to remove the spines therefrom.

5. The process of treating plants having spines, which consists in cooking the plant in a solution containing sodium chlorid and mono-sodium carbonate, agitating the plant while cooking to remove the spines therefrom, drying the product, grinding the dried product to form a meal, and separating the burs from the meal.

6. The process of treating plants having spines, which consists in cooking the plant in a solution containing sodium chlorid and mono-sodium carbonate, and tumbling the plant while cooking to remove the spines.

7. The process of treating plants having spines, which consists in cooking the plants in a solution containing sodium chlorid and mono-sodium carbonate, tumbling the plant while cooking to remove the spines, drying the product, grinding the dried product to form a meal and separating the burs from the meal.

8. The product resulting from cooking cactus in a solution containing sodium chlorid and mono-sodium carbonate.

9. The product resulting from cooking cactus in a solution containing sodium chlorid and mono-sodium carbonate, and draining the liquor therefrom.

In witness that I claim the foregoing, I have hereunto subscribed my name, this 31st day of December, 1917.

FRANK H. BRYANT.